United States Patent
Garfunkel et al.

(10) Patent No.: US 6,615,404 B1
(45) Date of Patent: Sep. 2, 2003

(54) METHOD AND APPARATUS FOR DOWNLOADING SOFTWARE INTO AN EMBEDDED-SYSTEM

(75) Inventors: Arie Garfunkel, Givataim (IL); Avigail Szust, Petach-Tikva (IL)

(73) Assignee: Tadiran Telecom Business Systems Ltd., Petach-Tikva (IL)

( * ) Notice: Subject to any disclaimer, the term of this patent is extended or adjusted under 35 U.S.C. 154(b) by 0 days.

(21) Appl. No.: 09/313,609

(22) Filed: May 18, 1999

(30) Foreign Application Priority Data

May 13, 1999 (IL) ............................................. 129947

(51) Int. Cl.$^7$ ............................................... G06F 9/45
(52) U.S. Cl. ........................................ 717/173; 717/178
(58) Field of Search ............................ 717/11, 173, 178

(56) References Cited

U.S. PATENT DOCUMENTS

| | | | | |
|---|---|---|---|---|
| 5,388,267 A | * | 2/1995 | Chan et al. ..................... 713/2 |
| 5,452,339 A | * | 9/1995 | Siu et al. ....................... 379/27 |
| 5,473,775 A | * | 12/1995 | Sakai et al. .................. 711/101 |
| 5,522,076 A | * | 5/1996 | Dewa et al. ..................... 713/2 |
| 5,535,355 A | * | 7/1996 | Scales ......................... 711/101 |
| 5,568,641 A | * | 10/1996 | Nelson et al. ................... 713/2 |
| 5,579,522 A | * | 11/1996 | Christeson et al. .............. 713/2 |
| 5,592,669 A | * | 1/1997 | Robinson et al. ............ 707/206 |
| 5,630,093 A | * | 5/1997 | Holzhammer et al. ...... 711/115 |
| 5,647,986 A | | 7/1997 | Nawathe et al. ............. 210/608 |
| 5,666,293 A | * | 9/1997 | Metz et al. ................... 709/220 |
| 5,701,492 A | * | 12/1997 | Wadsworth et al. ........ 711/103 |
| 5,748,940 A | * | 5/1998 | Angelo et al. ............... 711/163 |
| 5,812,883 A | * | 9/1998 | Rao ............................. 360/133 |
| 5,930,358 A | * | 7/1999 | Rao ............................. 360/133 |
| 5,940,074 A | * | 8/1999 | Britt, Jr. et al. ............. 345/333 |
| 5,966,301 A | * | 10/1999 | Cook et al. ..................... 700/3 |
| 6,029,046 A | * | 2/2000 | Khan et al. ................... 455/6.2 |
| 6,035,423 A | * | 3/2000 | Hodges et al. ................. 714/38 |
| 6,055,632 A | * | 4/2000 | Deegan et al. .............. 713/100 |
| 6,085,299 A | * | 7/2000 | Angelo et al. ............... 711/104 |
| 6,135,651 A | * | 10/2000 | Leinfelder et al. ............. 717/11 |
| 6,148,441 A | * | 11/2000 | Woodward ................... 711/163 |
| 6,185,678 B1 | * | 2/2001 | Arbaugh et al. ................ 713/2 |
| 6,253,281 B1 | * | 6/2001 | Hall ............................ 711/103 |
| 6,308,265 B1 | * | 10/2001 | Miller ......................... 710/10 |
| 6,385,721 B1 | * | 5/2002 | Puckette ........................ 713/2 |
| 2001/0026472 A1 | * | 10/2001 | Harari et al. .......... 365/185.03 |

FOREIGN PATENT DOCUMENTS

EP 0723226 * 7/1996 ........... G06F/11/14

* cited by examiner

Primary Examiner—John Chavis
(74) Attorney, Agent, or Firm—Nath&Associates PLLC; Harold L. Novick; Marvin C. Berkowitz

(57) ABSTRACT

Method for upgrading operating software and/or initialization program versions of an embedded system by using a single non-volatile memory. The non-volatile memory comprises a write-protected area containing an original initialization and download operation program version, and an unprotected area containing an upgradable initialization and download operation program version. Upon initialization, the upgradable, or the original version, of the initialization and download operation program version is copied into a second memory and/or into a memory location. The embedded system is operated from the second memory and/or memory location, enabling the downloading of the new operating software and/or initialization program versions and programming the unprotected area with the downloaded versions.

23 Claims, 2 Drawing Sheets

METHOD AND APPARATUS FOR DOWNLOADING SOFTWARE INTO AN EMBEDDED-SYSTEM

FIELD OF THE INVENTION

The present invention relates to the field of embedded systems. More particularly, the invention relates to an effective method and apparatus for upgrading software versions which are used to control the operation of embedded systems, by downloading new software versions, on-board and using a fail-safe procedure, into a single non-volatile memory of an embedded system.

BACKGROUND OF THE INVENTION

Embedded systems are widely used in industry and in office and consumer products. Actually, embedded systems include almost any device, which employs a microprocessor and/or a microcontroller and is not directed only to general-purpose computation. The control system is "embedded" into the device and is an integral part of it. Such devices are used to control, monitor or assist the operation of machinery and equipment of many types. For example, telephones, and many other electronic devices are operated and controlled by a firmware, which is a specific software that is stored in (or "burned" into) a memory of the electronic device, and is constantly called by a controller and/or a processing unit which normally operates the device.

In many devices, the firmware is linked to a database, which is also stored in the same or in another memory, and contains necessary information, required for proper operation of the device. Normally, the device contains a specific Printed Circuit Board (PCB), on which the controller or the processing unit, and the required linked memories are assembled (normally soldered). This PCB structure is widely used, since it saves space and is cost effective in mass-production. Original versions of the firmware and the contents of the database, are initially downloaded into the memory of the device by the manufacturer, before delivery to the customer, and in conjunction with a processor or a controller, serve as an operating system of the device.

In many cases, improvements in the features of the device are desired as time progresses, due to customer demands, and new features are offered by the manufacturer who continues with research and development activity in order to improve the capability of the device. Such improvements may be implemented by upgrading the firmware and/or the contents of the database in the device, from time to time, with a new version. This upgrade requires downloading of the new version, and overwriting (programming) the memory cells which contain the preceding firmware and database version. Upgrading may be carried out in the field, by a technician, or by a data source such as a Personal Computer (PC), via a data communication link which is connected to the device, so as to eliminate the need of returning the device to the manufacturer for upgrading. In addition, it is highly desired to enable an on-board upgrade, i.e., to eliminate disassembly of the upgradeable components (e.g. memory devices) from the PCB.

Most of the embedded systems employ an initialization process, known as a "boot" operation, in which a basic software or specific instructions are loaded from a boot sector (a sector represents a unit of storage space) of a memory, until the system is brought into its normal operation mode. Booting capability should be sustained even when the download process has failed, or the downloaded firmware version is corrupted for any reason, so as to enable another download and programming process. Therefore, boot instructions should be stored and recovered safely whenever a failure in the downloading or the programming process occurs. A typical known solution is to store the boot instructions in a Read Only Memory (ROM), which is non-volatile (i.e., it retains its stored data with no need for power supply) and is write protected. However, even though a ROM has a relatively high density, it is not upgradeable and should be operated with additional reprogrammable non-volatile memories to enable the stored firmware version to be overwritten. Therefore, this solution is not flexible or cost effective since more than one non-volatile memory is required, which also consumes precious PCB area and the boot sector can not be upgraded. Moreover, initial programming of a ROM is relatively time consuming, and is cost-effective mostly in mass production.

U.S. Pat. No. 5,666,293 discloses a method for upgrading the operating system software of terminal devices by downloading new versions through a broadcast channel. Upgrading is carried out by performing a cyclic broadcast of a packetized data file, which contains the operating system, which is captured and stored by the terminal devices. However, the operating system upgrade routine is stored in a ROM which is operated alone or with combination with a write protected sector of a Non-Volatile Random Access Memory (NVRAM). In addition, booting up the operating system, which is stored in the NVRAM, is carried out by a loader program, which is stored in a ROM and is not upgradeable.

U.S. Pat. No. 5,647,986 discloses an automated apparatus for wastewater treatment, which is controlled by a controller. The controller includes a combination of a flash memory and a boot memory, with remote programming capability. The flash memory stores the operating program of the apparatus and the boot memory contains a boot code, which is required to handle basic communication and reprogramming of the flash memory. The controller establishes a connection with a central computer from which a new operating program is downloaded, and receives a command to erase the contents of the flash memory. After the contents of the latter have been erased, the controller begins to reprogram the flash memory with data that is transmitted from the central computer. After the programming is completed, the controller reboots the processing unit of the apparatus and the apparatus starts to operate according to the updated operating program. However, this apparatus has no backup or reboot capability in the event of a failure during download and/or programming process and requires a separate non-upgradable boot memory.

The art has not yet provided satisfactory solutions to the problem of on-board downloading new software and boot versions into a single non-volatile memory of an embedded system, using a fail-safe procedure, that also allows for upgrading of the download control program.

It is an object of the present invention to provide a method and apparatus for downloading new software and boot versions into the memory of an embedded system, using a fail-safe procedure.

It is another object of the present invention to provide a method and apparatus for downloading new software and boot versions into the memory of an embedded system, which is carried out on-board and in the field.

It is a further object of the present invention to provide a method and apparatus for downloading new software and boot versions into the memory of an embedded system, which employs a single non-volatile memory component.

Other objects and advantages of the invention will become apparent as the description proceeds.

SUMMARY OF THE INVENTION

The invention is directed to a method for field upgrading of an operating software and/or initialization program version of an embedded-system. A single non-volatile memory component, such as a flash memory, is divided into a write-protected area and an unprotected area. The unprotected area is used to store downloaded software versions. The hardware write protected area in the flash memory is used to store an original version of the initialization and download program, and may be programmed only by relatively high voltage which is not available in the field. The original protected initialization and download program functions as a backup program, which is used to perform a new downloading process whenever a current downloading process fails. The write-protected area eliminates the need for additional non-volatile memory, such as a ROM.

Preferably, the last valid version of the initialization and download program, which is stored in the flash memory, is copied into a volatile memory, such as a RAM, and the embedded-system is operated from the RAM. This enables the downloading process of a new initialization program and operating software version during normal operation of the embedded-system. Preferably, at the initialization process, the initialization and download program is copied into the RAM and the embedded-system is operated from the RAM to perform initialization and downloading functions, if desired. Alternatively, all or part of the system functions may be duplicated and operated from the RAM to allow additional functionality during the upgrade process.

Downloading is carried out via a data receiving input into the embedded-system. The downloaded data is verified and if found valid, is programmed into the unprotected area of the flash memory. Alternatively, in order to be upgraded, the flash memory may first be erased, and the data is stored directly into the unprotected area of the flash memory. If a downloading process is disrupted by an unrecoverable error, it may be completed after activating the original initialization process from the write protected areas of the flash memory, or an updated initialization process from the unprotected areas of the flash memory. The downloading and programming process is restarted from the beginning, or alternatively continued from the detection point of the data error. After programming, the system is rebooted and the updated initialization process stored in the unprotected area of the flash memory is activated, copied into the RAM and the embedded-system is operated by the new operating software version. Alternatively, all or part of the operating software may be copied into, and subsequently run from, the RAM.

Preferably, downloading of a new version is carried out in the field by a data source, such as a PC, which is connected to the data receiving input of the embedded system, or from a remote data source by transmitting data groups from the remote source over a data link into the data receiving input of the embedded system.

The invention is also directed to an embedded system having in field and on-board upgrading capability of its operating software and/or initialization program version without affecting its normal operation. The embedded system comprises

- a single non-volatile memory component containing a write protected area for storing an original initialization and download program of the embedded system and an unprotected area for storing at least updated version of the initialization and download program;
- a volatile memory for storing initialization programs and/or operating software versions of the embedded-system, which enables simultaneous operation and reprogramming of new versions;
- a control circuitry for controlling the initialization process and the operation of the embedded-system, for copying the contents of the non-volatile memory into the volatile memory and for downloading, verifying and programming new versions of said operating software and/or said initialization program; and
- a data receiving input for downloading software and/or said initialization program versions.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

Figure 1:
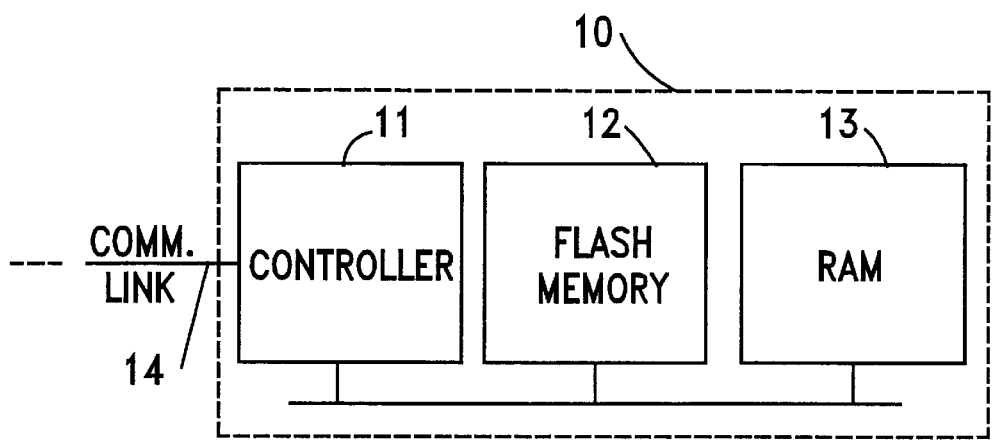
FIG. 1 is a block diagram of a software upgradable embedded system with a single non-volatile memory, according to a preferred embodiment of the invention.

FIG. 1 is a block diagram of a software upgradable embedded system with a single non-volatile memory component, according to a preferred embodiment of the invention. The embedded system 10 is controlled by a controller 11, which is linked to a flash memory 12 and a Random Access Memory (RAM) 13 and operates the system functions according to an operating software which is stored in the flash memory 12. The flash memory 12 is the only non-volatile memory which is required for storing the operating software and/or other desired instructions. The RAM 13 is a volatile memory which is used for temporary storage of the initialization and download program, and enables the controller 11 to operate the system 10 during download mode, using the latest software version which is copied from the flash memory 12 into the RAM 13, each time the system is initialized. In an alternative embodiment, some or all of the operating program may also be copied into RAM 13 so as to allow additional functionality during the download process. For example, in a smart telephone, part of the telephone operating control program that allows for dialing, ringing type of the phone for incoming calls, and other basic functions may be copied into RAM 13, allowing this functionality during a download. It is also possible to copy the entire operating program into RAM 13, allowing for complete operation during a download, in which case all software will be run from the RAM. The main advantage of a flash memory is that it is a non-volatile high-density device, whose contents can be easily modified "in-system", i.e., without the need for disassembly.

System 10 is connected to a data source via a communication link 14, through which new program versions may be downloaded into the flash memory 12 and/or the RAM 13. The controller 11 controls data flow. Therefore, downloading and programming of a new software and firmware version into system 10 may be carried out via the link 14, typically by connecting a programming device (e.g., a computer) to the link 14. Thus, upgrades can be carried out in the field, and distributed on CD-ROMs or over the Internet. For example, system 10 may be a smart telephone, which may be programmed by downloading new software versions from an attached PC, via a serial (e.g., an RS-232) connection, which serves as the data communication link 14. During normal operation of the system 10, each time when the system 10 is turned on, a boot process is started according to instruction which are stored in the flash memory 12 and copied into the RAM 13. After the boot process, the system 10 is brought to its normal operation mode and the controller 11 controls the system functions, following the program stored in RAM 13 and/or flash memory 12. Normally, the original (first) software version is programmed into the flash memory 12 by the manufacturer, and is updated from time to time by updating in the field new (and advanced) versions which improve the functionality of the system 10 and/or offers new features to the user. However, for several reasons, sometimes the downloading process disrupted, or a part of the new software version is corrupted (e.g., due to unrecoverable errors which occur during the data transfer through the communication link 14). Since downloading and programming involve data erasing of the preceding software version from the memory, a situation where the flash memory contains only the corrupted or incomplete software version should be eliminated. It is therefore extremely important to keep the boot procedure protected and available for reuse, so as to enable a new boot process and a following downloading and programming operation. In another preferred embodiment, it is desireable to provide a memory arrangement which simultaneously enables the system 10 to operate at some level of functionality according to the current software version, and to program the system 10 with a new software version (i.e., the operation of the system 10 is not completely stopped while programming it with the new software version). RAM 13 is used to store part or the entire current software version required for operation, while the flash memory 12 is programmed. At a minimum, RAM 13 is used to store and operate the downloading program. In addition, it is desired to allow upgrading of the boot and download procedures themselves. Current flash memory technology does not allow for the same memory component to be simultaneously accessed while being programmed in any sector.

Figure 2:
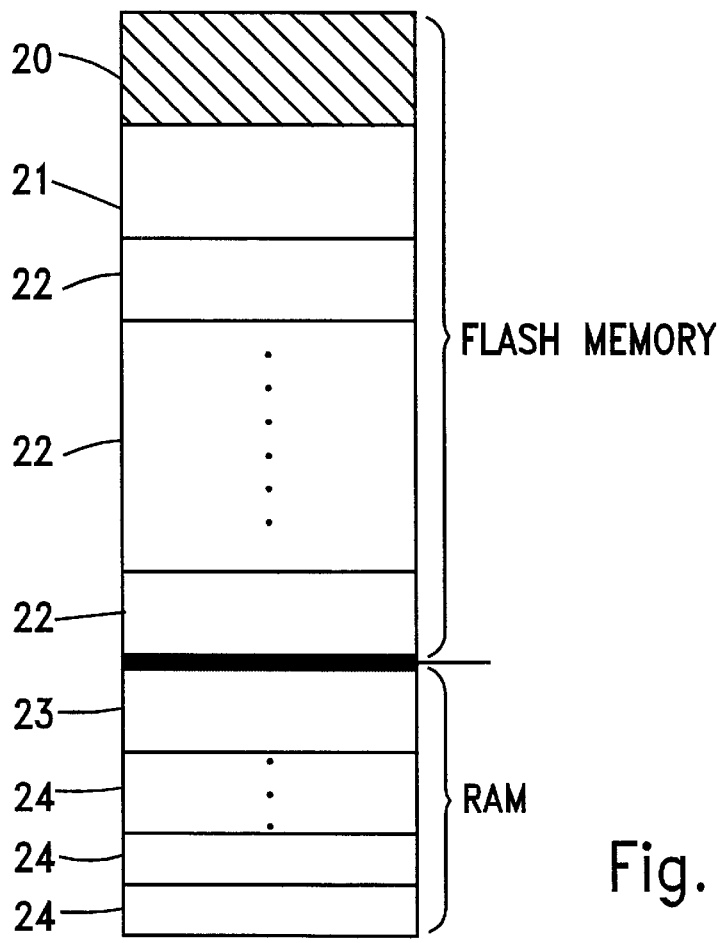
FIG. 2 schematically illustrates the memory arrangement of the embedded system of FIG. 1, according to a preferred embodiment of the invention.
Figure 3:
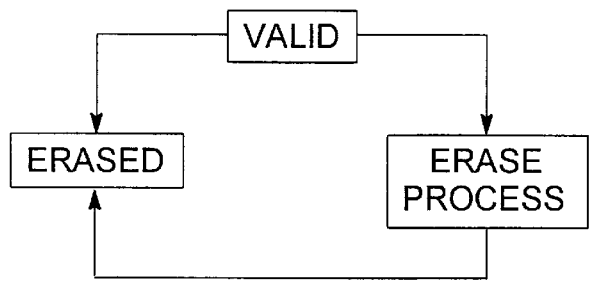
FIG. 3 is a flow chart of the status word of a non-volatile memory system, according to a preferred embodiment of the invention.

FIG. 2 schematically illustrates the memory arrangement of the embedded system of FIG. 1, according to a preferred embodiment of the invention. The storage space of the flash memory 12 is divided into a plurality of sectors, also known as segments (minimum three sectors). Two sectors are used to store the boot program, and the other sectors are used to store the current version of the operation software, which may have been upgraded by a download operation. One boot sector 20 in the flash memory contains the original boot program as programmed by the manufacturer, and is hardware protected. The hardware protection may be accomplished, for example, by requiring a relatively high voltage, which is not available in the field to enable a write function. As a result, the system 10 has a protected boot sector that can not be upgraded in the field. The other boot sector 21, which is not write protected, is also initially programmed with the original boot program, and may be upgraded with new versions. A flag, appended at the end of the sector, is used as a status flag for each accessible sector 21 and 22 of the flash memory 12. Referring to FIG. 3, we find a state diagram of the status flag. The flag is programmed at the factory in the "valid" state. The first step in the update process involves resetting this flag to "erase process". Once this is set, the update process can begin, which entails erasing the current program. After the erase procedure is completed the flag is reset to the "erased" state. After a sector is programmed, and verified, the flag is again restored to the "valid" state.

During the download process, a CRC (Cyclic Redundancy Code) is appended by the remote data source (of new software/boot versions) to each block of data that is transmitted to the system 10 over the link 14. The controller 11 applies the same CRC calculation to the received data and compares the result, which has been appended to the data block before transmission. If the results agree, it is an indication that the data block has been received successfully, i.e., without data errors, and is a correct copy. If the results do not agree, a request is transmitted over the communication line 14 to resend the data block and the block is then resent by the remote data source. This procedure is well known to a person who is skilled in the art. Once a logical sector has been properly received, as indicated by a valid CRC code, the sector is programmed by the upgrade program being run. The data is then read from the stored sector, and again confirmed, following which the status flag at the end of the sector is set to "valid".

According to a preferred embodiment of the invention, this dual boot sector arrangement (of a write protected and an accessible sectors) in the flash memory 12 enables reboot operation whenever the downloading process is disrupted, by using the original boot program, stored in the write protected boot sector 20, or an updated boot program, using the contents of accessible boot sector 21 if a correct copy exists, as indicated by the status flag. If the flag is valid, the updated boot program is copied into a memory segment 23 (a boot segment) in the RAM 13, which is used to boot the system 10 whenever the system is restarted, such as after downloading and programming of the flash memory 12. If the flag of boot sector 21 was not valid, then the original, hardware protected version of the boot program is copied into memory segment 23. The RAM 13 comprises additional segments 24, into which downloaded data blocks may be copied for temporary storage, if desired. The system 10 is operated and controlled by the controller 11 by using the (copied) boot program which is stored in the RAM 13 and the software which is stored in the flash memory 12. Thus, whenever the system starts up, on of the two boot segments, 20 or 21, is copied into segment 23 in the RAM 13. The program is thus always operated from the same address space, irrespective of which code versions are used.

Figure 4:
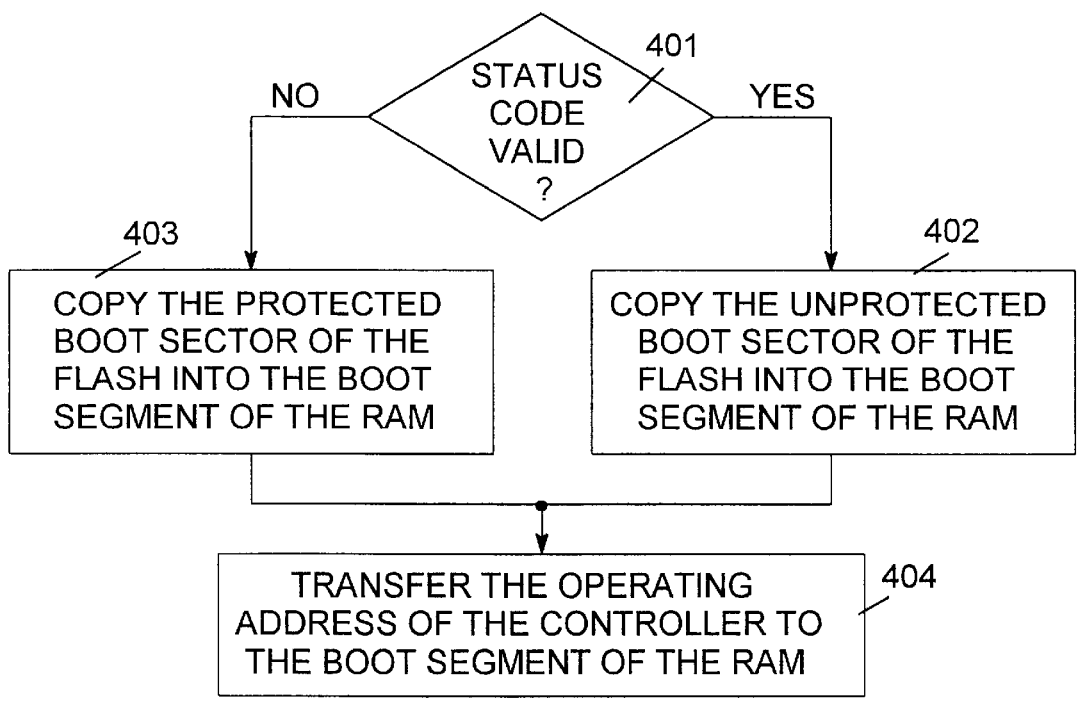
FIG. 4 is a flow chart of the embedded-system operation, according to a preferred embodiment of the invention.

FIG. 4 is a flow chart of the embedded-system operation, according to a preferred embodiment of the invention. The program starts from sector 20 of the flash memory. At the first step 401, the validity of the software stored in sector 21 is checked, by checking its status flag, which is stored at the end in the same sector. If found valid, at the next step 402, the content of sector 21 is copied into segment 23 in the RAM 13. If found invalid, at the next step 403, the content of segment 20 is copied into sector 23 in the RAM 13. At the next step 404, the operating address of the controller 11 is transferred to (operate from) sector 23. The program, which is copied into sector 23, at least allows the controller 11 to operate the downlink 14 and to update the flash memory 12.

According to another preferred embodiment of the invention, one or more sectors 22 of the flash memory 12 are also copied into the RAM 13. In this case, the controller 11 operates that section of the program from the RAM 13, rather than from the flash memory 12. This allows additional functionality during downloading, since the program can not run from same addresses, being updated. In current practice, during updating, software can not be run from the flash memory 12 at all, and therefore, only software copied into RAM 13 is functional.

Sectors 22 in the flash memory 12, together with the boot sector 23 in the RAM 13 are used to generate a software version. The original software version is programmed into the sectors 22 of the flash memory by the manufacturer. During operation, if the last version of the boot program (the original boot program in the first operation) is found to be valid, it is copied from the unprotected boot sector 21 into the boot segment 23, and the last software version (the original software version in the first operation) is used from sectors 22 to allow the controller 11 to operate the system 10 from the RAM 13, and the flash memory 12.

The boot program may also be updated by transmitting a new boot data block and programming the unprotected boot sector 21 with the received boot data block. The protected boot sector 20 contains the original boot program as a backup. When the system 10 initializes, the controller 11 selects the boot program which is used for initialization by first checking the validity of the last boot program version which is stored in the boot sector 21. If the status code of the received (new) boot data block is found valid, the last boot program is copied from sector 21 into the boot segment 23 of the RAM 13, and the initialization process continues from the RAM 13 according to the last (updated) boot program version. If the status code of sector 21, indicates that the received (new) boot data block is not valid, the original boot program is copied from sector 20 into the boot segment 23 of the RAM 13, and the initialization process continues from the RAM 13 according to the original boot program version, and a new downloading and programming process is enabled. Therefore, by using dual boot sectors in the flash memory 12, the downloading and programming process is failsafe. According to a preferred embodiment of the invention, if the status code of sector 21 indicates that the received (new) boot data block is not valid, in addition to copying the original boot program from sector 20 into the boot sector 23 of the RAM 13, additional logical segments from sectors 22 are copied into RAM 24 to allow for additional functionality. Each sector is only loaded if its status word indicates that it is valid. The operating program must be so designed so as to allow independent functionality from each logical segment, so that some additional valid segments will be able to operate in the absence of others that are not valid.

According to a preferred embodiment of the invention, the downloading and programming operations which are described above, and are carried out by transmitting updated data blocks from a remote source over the communication link, may also be carried out similarly in the field and on-board, by a technician or a user who connects the data source, such as a PC, to a suitable input in the system 10 or to the data link input (e.g., a serial RS-232 port).

The above examples and description have of course been provided only for the purpose of illustrations, and are not intended to limit the invention in any way. As will be appreciated by the skilled person, the invention can be carried out in a great variety of ways, using a microcontroller or a microprocessor to control the operation of the embedded system, employing more than one technique from those described above, such as using a wireless data communication link for downloading upgraded software versions, implementing the embedded system on a monolithic circuitry, using other volatile and non-volatile memory types, other than a flash memory and/or a RAM, all without exceeding the scope of the invention.

What is claimed is:

1. A method for upgrading operating software and/or boot initialization program versions of an embedded system which comprises:
   a programmable, non-volatile flash-type first memory having two boot sectors, a first write-protected boot sector area containing an original non-upgradable boot initialization and download program version, and a second unprotected boot sector area containing an upgradable boot initialization and download program, said flash-type first memory further comprising at least one unprotected area containing an upgradable operating program version, and
   a second memory, which method comprises:
   a) upon initialization, copying one of said upgradable or the original of said boot initialization and download program versions, into said second memory;
   b) operating said embedded system from said second memory; and
   c) enabling downloading of new operating software and/or boot program versions and programming respective areas of said unprotected area with said downloaded versions.

2. A method according to claim 1, wherein said second memory is physically separated from said first memory.

3. A method according to claim 1, wherein the downloading of a new version is carried out by using a portable data source connected to the data-receiving input of the embedded system.

4. A method according to claim 1, wherein the downloading of a new version is carried out from a remote data source by transmitting data groups from said source over a data link into the data-receiving input of the embedded system.

5. A method according to claim 4, wherein the data link is a wireless link.

6. A method according to claim 2, wherein the second memory is a volatile memory.

7. A method according to claim 1, wherein the arrival of disrupted downloaded data is detected by checking a data status code.

8. A method according to claim 1, wherein upon initialization, performing the following steps:
   a) checking a status code of said upgradable boot initialization and download program version in the unprotected area;
   b) if said status code indicates a valid initialization and download program version, copying said upgradable boot initialization and download program version into said second memory; and
   c) if said status code does not indicate a valid initialization and download program version, copying said original non-upgradable boot initialization and download program version into said second memory.

9. A method according to claim 1, wherein the embedded system is a telephone.

10. A method according to claim 1, wherein the embedded system is a telecommunication system.

11. An embedded system having a software upgrade capability for its operating software and/or boot initialization program versions, comprising:
    a) a single non-volatile flash type memory having two boot sectors, a first write-protected area boot sector area for storing an original non-upgradable boot initialization and download program version of said embedded system and a second unprotected boot sector area for storing an upgradable boot initialization and download program version of said embedded-system, and at least one unprotected area for storing an upgradable operating software program version;

b) a second memory for storing a selected one of said non-upgradable or upgradable boot initialization and download program versions of said embedded-system;

c) control circuitry that controls an initialization process and operation of said embedded system to copy the contents of said original non-upgradable boot initialization and download program or said upgradable boot initialization and download program version into said second memory and to download and program new initialization and download and/or operating program versions; and d) a data receiving input that receives said downloaded operating program and/or said boot initialization and download program versions.

12. Embedded system according to claim 11, in which said second memory is physically separated from said first memory.

13. Embedded system according to claim 11, into which new versions are downloaded by using a data source, connected to its data receiving input.

14. Embedded system according to claim 11, having a data communication link for receiving and downloading of data new versions, transmitted by a data source.

15. Embedded system according to claim 11, wherein the data communication link is a wireless link.

16. Embedded system according to claim 11, in which the second memory is a volatile memory.

17. Embedded system according to claim 11, in which the control circuitry operates at least according to the following steps:

a) upon initialization, checking a status word in said unprotected area;

b) if said status word indicates a valid initialization and download operation program version, copying the program version into a second memory and/or into a memory location; and c) if said status word does not indicate a valid initialization and download operation program version, copying said original initialization and download operation program version into a second memory and/or into a memory location.

18. Embedded system according to claim 11, in which the original initialization program is used whenever the data status word does not indicate the upgradable initialization and download program version is valid.

19. Embedded system according to claim 11, being a telephone.

20. Embedded system according to claim 11, being a telecommunication system.

21. The method according to claim 1 further comprising copying at least a portion of a presently stored upgradable operating program version into said second memory whereby functionality of said embedded system can be maintained during an upgrading and downloading operation.

22. The method according to claim 1 wherein said downloaded version of said operating software and/or boot program is stored directly to said respective portion of said unprotected area.

23. The method according to claim 22 further comprising erasing said respective portions of said unprotected area before storing said downloaded version.

\* \* \* \* \*